(No Model.)

2 Sheets—Sheet 1.

O. N. FELTS.
GANG PLOW.

No. 283,585.  Patented Aug. 21, 1883.

WITNESSES
F. L. Durand
J. R. Littell

INVENTOR
O. N. Felts
by C. A. Snow & Co.
Attorneys (No Model.) 2 Sheets—Sheet 2.

O. N. FELTS.
GANG PLOW.

No. 283,585. Patented Aug. 21, 1883.

UNITED STATES PATENT OFFICE.

OSCAR NICHOLAS FELTS, OF CARRINGTON, MISSOURI.

GANG-PLOW.

SPECIFICATION forming part of Letters Patent No. 283,585, dated August 21, 1883.

Application filed May 18, 1883. (No model.)

*To all whom it may concern:*

Be it known that I, OSCAR N. FELTS, a citizen of the United States, residing at Carrington, in the county of Callaway and State of Missouri, have invented a new and useful Gang-Plow, of which the following is a specification, reference being had to the accompanying drawings.

This invention relates to gang-plows; and it consists in certain improvements in the construction of the same, having for their object to produce a machine possessing superior advantages in point of simplicity, durability, and general efficiency, which improvements will be hereinafter fully described, and particularly pointed out in the claims.

Figure 1:
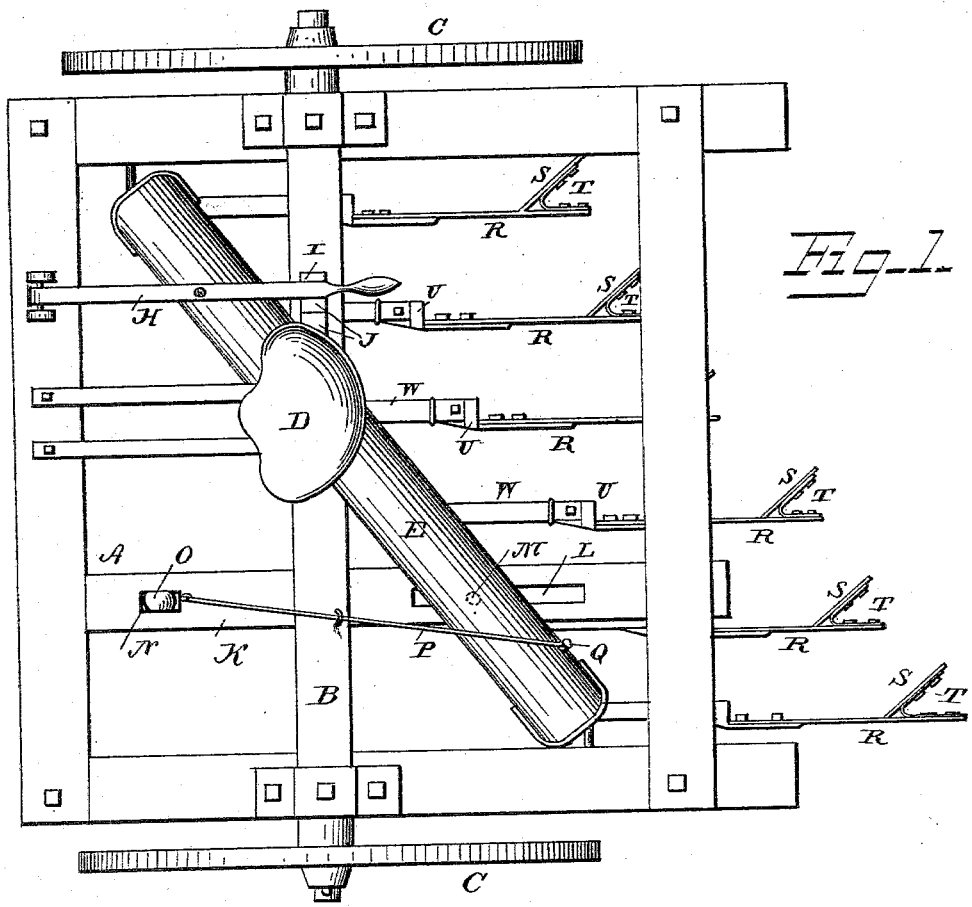
Figure 2:
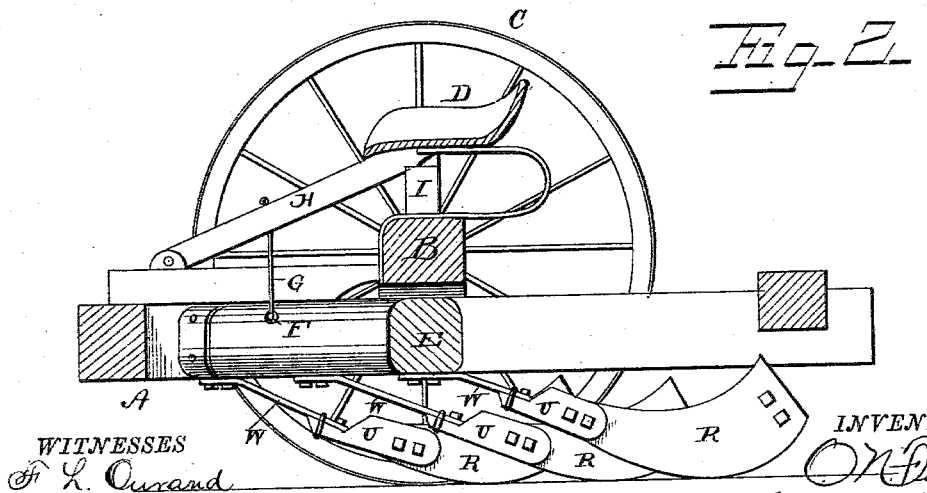
Figure 3:
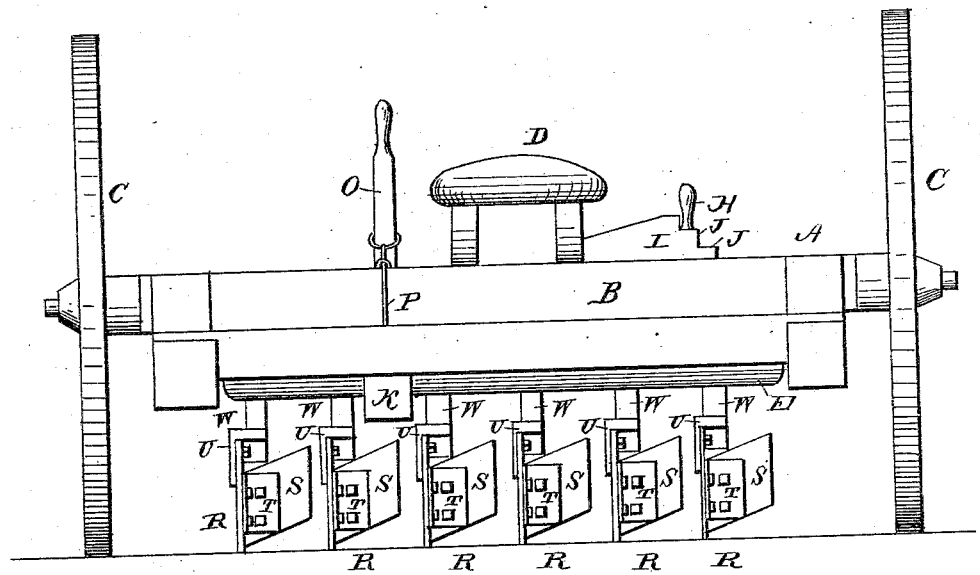
Figure 4:
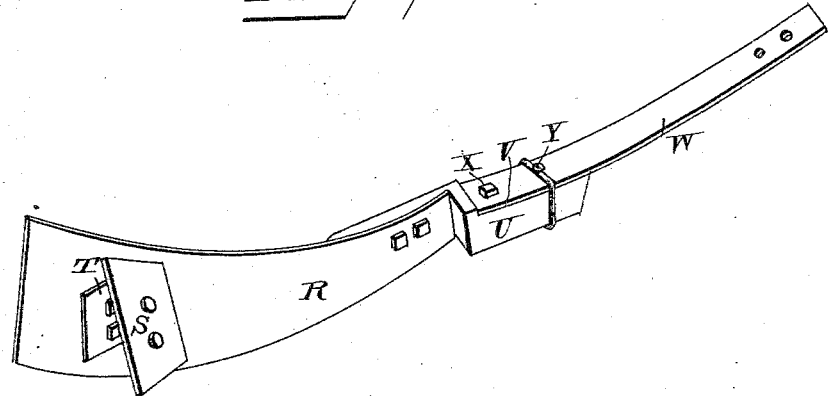

In the drawings hereto annexed, Figure 1 is a plan view of my improved gang-plow. Fig. 2 is a longitudinal vertical sectional view. Fig. 3 is a rear view; and Fig. 4 is a detail view, in perspective, of one of the plows detached.

The same letters refer to the same parts in all the figures.

A in the drawings designates the frame of my improved plow, which is rectangular in shape, and provided with the axle B, mounted upon wheels C C. A spring-seat, D, for the driver is mounted upon the axle, or in any suitable position.

E is a beam pivoted diagonally between the corners of the frame, and having on its front side a stud, F, connected by a rope or chain, G, with an arm or lever, H, pivoted upon the front cross-bar of the frame. The axle B has on its upper side a casting, I, having a series of steps, J J, on any one of which the lever or arm H may be supported. It will be seen that by raising the lever H to a higher step the upper side of the diagonal bar or beam E may be turned slightly in a rearward direction, and that it will be held securely in the position to which it is adjusted and prevented from turning forwardly by the action of the lever and its attachments.

K is a longitudinal bar or brace, secured to the frame A, and having a slot, L, that receives a stud or lug, M, projecting downwardly from the diagonal bar or beam E, and which serves to brace and to prevent displacement, lateral or otherwise, of the said beam. The longitudinal brace K has near its front end a slot, N, in which is pivoted a lever, O, connected by a chain or rod, P, with a stud, Q, upon the upper side of the beam E. Suitable means may be provided for retaining the lever O securely in any position to which it may be adjusted. By means of the said lever the upper side of the beam E may be turned in a forward direction and retained securely in such position, the object of which will be presently more fully described.

R R designate the plows, of which any desired number may be used, according to the desired capacity of the machine. The said plows are constructed of wrought-iron, preferably, and in shape and general outline approximate the runners or furrow-openers used in connection with ordinary corn-planters—that is, they consist mainly of vertical sharp-edged plates curved or rounded at the front, so that they will readily cut the soil. To the sides of these plates the mold-boards S are bolted or otherwise secured, and these are braced by metallic frogs or angle-plates T, bolted to the rear inner sides of the plows and mold-boards, which are thereby connected and strengthened.

To the upper front ends of the plow-plates R are bolted castings U, the front ends of which have sockets or recesses V, in which flat springs W are seated. Said springs are secured in the sockets by means of bolts X and clamps Y. The said springs extend forwardly, so as to form the plow-beams, and their front ends are bolted or otherwise secured to the under side of the transverse beam E of the plow-frame.

The operation of this invention will be readily understood from the foregoing description, taken in connection with the drawings hereto annexed. The plows are held in the ground by their own weight, aided by the tension of the spring-beams, and the tension of the latter may be regulated by turning the beam E by means of the lever H, as herein described. By means of the lever O the beam E may be turned, so as to lift the plows out of the ground, when for any reason this shall be thought desirable.

The construction of my improved plow is simple and inexpensive, its operation is easy and convenient, and by its use the soil will be so thoroughly pulverized as to be fitted for the planting of grass and small grain without harrowing, thereby dispensing with considerable labor.

I claim as my invention and desire to secure by Letters Patent of the United States—

1. The combination of the plows, constructed substantially as described, the castings bolted to the upper front ends of the same, and the flat spring-beams seated in recesses in the said sockets and secured by vertical bolts and clamps, substantially as set forth.

2. As an improvement in gang-plows, the combination of the frame, the axle, a block or casting secured upon the same and having gradually-ascending steps, a lever pivoted upon the front end of the frame, and adapted to rest upon the said steps, a longitudinal slotted bar or brace, a diagonal pivoted bar having a stud working in the slot in said bar, a lever pivoted to the longitudinal brace, chains, or rods connecting said lever and that pivoted to the front bar of the frame with the diagonal pivoted bar, and the spring-beam plows secured to the under side of the latter, substantially as and for the purpose herein shown and specified.

In testimony that I claim the foregoing as my own I have hereto affixed my signature in presence of two witnesses.

OSCAR NICHOLAS FELTS.

Witnesses:
W. H. WILKERSON,
J. H. PEMBERTON.